Sept. 20, 1966 R. H. MERRICK 3,273,351
ABSORPTION REFRIGERATION
Filed May 20, 1964
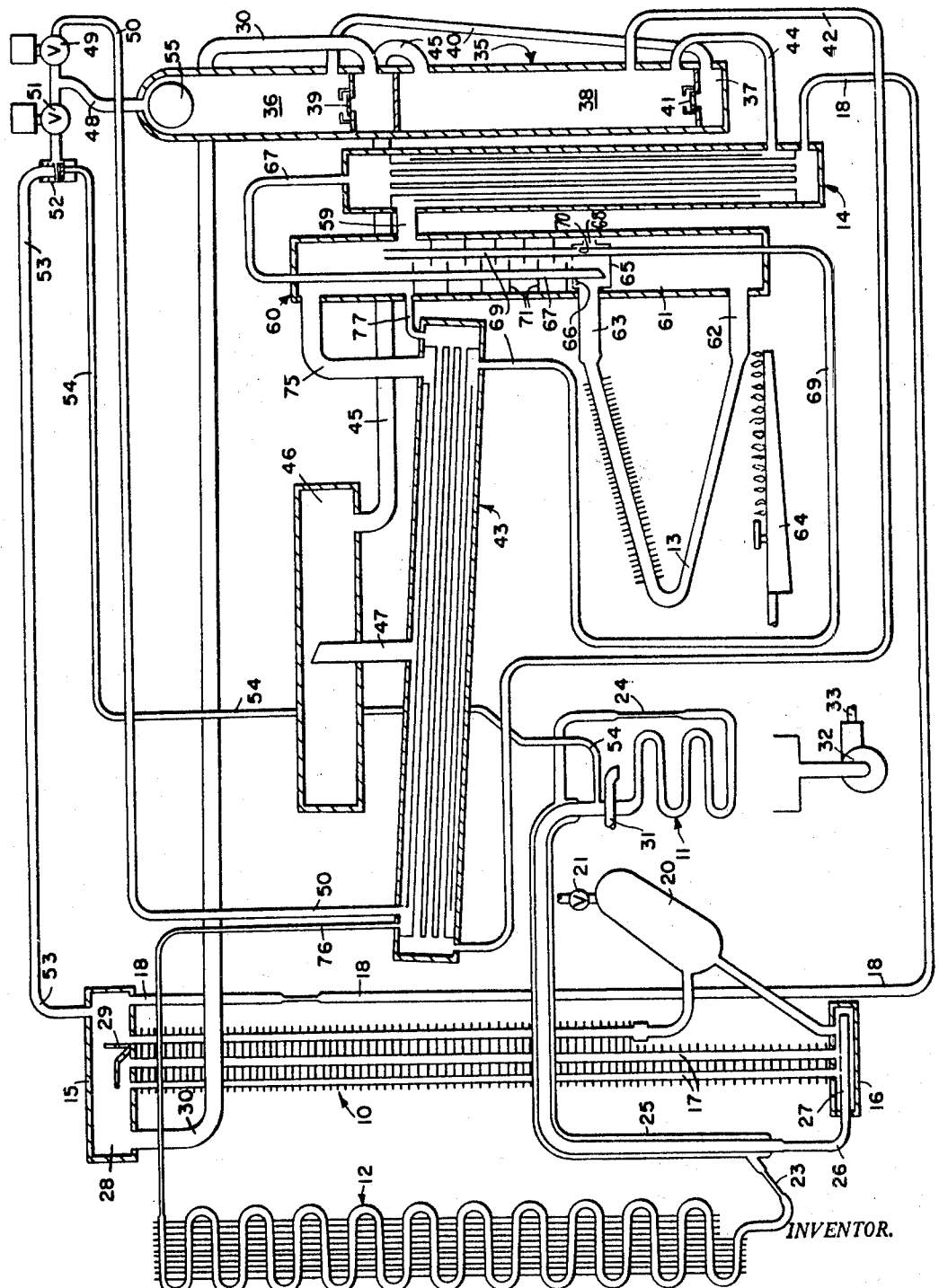
INVENTOR.
RICHARD H. MERRICK.
BY *Frank N. Decker jr.*
ATTORNEY.

3,273,351
ABSORPTION REFRIGERATION
Richard H. Merrick, Indianapolis, Ind., assignor to Carrier Corporation, Syracuse, N.Y., a corporation of Delaware
Filed May 20, 1964, Ser. No. 368,775
6 Claims. (Cl. 62—103)

This invention relates to absorption refrigeration, and more particularly, to absorption refrigeration machines of the type which employ an analyzer section to strip absorbent from vapor passing through the analyzer section from a generator section.

Absorption refrigeration machines of the type herein described, generally employ a generator section, a condenser section, an absorber section, and an evaporator section, arranged to provide refrigeration. A liquid refrigerant is supplied to the evaporator section where it absorbs heat from a load to be cooled and is vaporized. The vaporized refrigerant is absorbed in an absorbent solution in the absorber section. The diluted or weak absorbent solution, having refrigerant vapor absorbed therein, is forwarded to the generator section where it is heated to drive off refrigerant vapor and to concentrate the absorbent. The concentrated absorbent is returned to the absorber section, and the vapor is passed to the condenser section where it is liquefied and returned to the evaporator section.

When using a refrigerant, such as ammonia, and an absorbent, such as water, the vapor formed by heating weak solution in the generator contains a substantial quantity of absorbent vapor. Accordingly, it is usual practice in such machines to pass the hot vapor through an analyzer section in counterflow with weak absorbent solution, having a relatively high refrigerant vapor pressure, so that a mass and heat transfer takes place therebetween. Thus, refrigerant from the weak solution is vaporized into the stream of hot vapor passing through the analyzer section and is replaced by absorbent vapor which condenses from the vapor into the weak absorbent solution. The vapor passing through the analyzer section therefore emerges richer in refrigerant vapor and having less absorbent vapor than when it entered the analyzer.

The vapor leaving the analyzer section is then passed through a rectifier section where it is cooled by absorbent solution passing to the generator section and additional absorbent is condensed from the vapor. The vapor leaving the rectifier section is therefore relatively pure refrigerant vapor and is passed to the condenser section where it is liquefied, as previously explained.

Absorption refrigeration machines of the type described generally operate with a variable rate of internal flow of solution. The rate of solution flow will increase when the pressure difference between the generator and absorber sections increases, as for example, with high ambient temperatures. However, it is desirable to maintain the flow rates in the absorption machine as low as possible because energy must be put into the generator to heat all solution which is passed to it. Consequently, the coefficient of performance of the machine is improved by maintaining a minimum rate of flow of solution within it under all conditions. It is also necessary to provide a minimum solution head on the generator section for stable and efficient operation.

It has been prior practice to achieve these results by providing an outlet tank and a generator reservoir in the solution circuit of absorption refrigeration machines of the type described. The outlet tank served the function of controlling the rate of flow of solution to the generator and was necessary to smooth out the cycle when using a trap to transfer solution in batches to the generator. The generator reservoir served to provide a solution head on the generator and to feed solution to it. At the same time the generator reservoir provided for storage of solution which could not be stored in the outlet tank without changing the solution flow in the system, and to accommodate variations in the solution charge of the machine. It will be apparent that it would be desirable to provide improved control of the solution flows in the machine which could more quickly adjust for changes in operating conditions, and at the same time provide minimum solution flows in the machine. It would also be desirable to eliminate the cost and complexity of providing a separate generator reservoir which was necessary in the previously described system in order to accommodate variations in the solution flow rates.

Accordingly, it is an object of this invention to provide an improved absorption refrigeration machine and method of operating it.

It is a further object of this invention to provide an improved absorption refrigeration machine and method of operating it which utilizes the analyzer section in conjunction with an outlet tank to automatically regulate and maintain the desired solution flow to the generator and the desired solution head on the generator.

These and other objects of this invention are achieved in the illustrated, preferred embodiment thereof by providing an absorption refrigeration machine having an absorber section, a condenser section, an evaporator section, a generator section, a heat exchanger, and an analyzer section connected to provide refrigeration. An outlet tank is provided to receive weak absorbent solution from the absorber and is connected to forward weak solution through the heat exchanger to the analyzer. The analyzer comprises a vertically extending column wherein a substantial quantity of weak absorbent solution is contained and from which it is passed to the generator. The passage between the outlet tank through the heat exchanger and into the analyzer is arranged so as to provide a continuous column of liquid between the solution stored in the outlet tank and the solution stored in the analyzer section. Vapor formed in the generator section is bubbled upwardly through the quantity of weak solution in the analyzer section, which provides direct and highly effective mass and heat transfer therebetween. When conditions of operation of the absorption machine require increased solution flow to the generator, this solution is immediately supplied by the stored absorbent solution in the analyzer section, thus reducing the level of solution in the analyzer. The outlet tank is disposed relative to the analyzer section so that the level of solution in the outlet tank is above the level of solution in the analyzer. When the solution level in the analyzer drops, an increased head is present between the outlet tank and the analyzer, which in turn automatically increases the flow of solution to the analyzer and generator sections. Consequently, the flow of solution to the generator section may be minimized at all times, and is automatically and immediately increased at any required time. In addition, the analyzer always provides the desired head on the generator. Because the flow of solution in the machine is minimized, it will be apparent that the coefficient of performance of the machine and its operating economy are improved. Also, the complexity and cost of a separate generator reservoir is eliminated by the practice of this invention, without sacrificing the function previously performed by this component. In fact, the direct contact between vapor formed in the generator section and the solution stored in the analyzer section is highly desirable and effective in enriching the refrigerant concentration of the vapor by providing improved mass and heat transfer therebetween.

An additional advantage of the system herein described is that the outlet tank may serve the functions of smoothing out the trap cycle while at the same time accommodating both variations in the solution charge of the machine and providing for storage of solution during periods of low solution flow rates. This is made possible because the rate of flow of solution to the generator is independent of the level of solution in the outlet tank and dependent only on the difference in solution levels between the outlet tank and the analyzer. It will be seen that the arrangement described improves the efficiency and speed of response of the absorption machine. Also, this system eliminates the necessity of a separate generator reservoir by providing a new method and means for regulating the flow of solution to the generator which is dependent only on the difference in solution levels between the analyzer and outlet tank so that any amount of solution may be stored in the outlet tank.

These and other objects of this invention will become more apparent by reference to the following specification and attached drawing wherein the figure is a schematic diagram, partly in cross section, of an absorption refrigeration machine embodying this invention.

Referring particularly to the drawing, there is shown an absorption refrigeration machine comprising an absorber section 10, an evaporator section 11, an air-cooled condenser section 12, a generator section 13, and a heat exchanger section 14. A refrigeration machine of the type herein described may desirably use ammonia as a refrigerant and water as an absorbent solution; other refrigerant and absorbent combinations may be used instead if desired. As used herein, the term "strong solution" refers to an absorbent solution such as relatively pure water which is strong in absorbing power, and the expression "weak solution" refers to a dilute solution of absorbent having substantial refrigerant absorbed therein, which is weak in absorbing power.

Absorber section 10 comprises an upper header 15 and a lower header 16 connected by a plurality of heat exchange tubes 17. A strong solution line 18 forwards strong solution into upper header 15 from which it passes downwardly to lower header 16 through one or more recirculation lines 17. A suitable purge tank 20 with a purge valve 21 therein may be provided for the collection and purging of relatively noncondensible gases.

Liquid refrigerant is supplied from condenser 12 through a restriction 23, through one side of refrigerant heat exchanger 25, and a restriction 24 to evaporator coil 11. The refrigerant is vaporized in evaporator coil 11 and the vapor is returned through the other side of refrigerant heat exchanger 25 and refrigerant vapor line 26 to vapor distributor 27 in lower header 16 of absorber section 10. Water to be chilled, which comprises the load on the refrigeration machine, is supplied through entering chilled water line 31 and distributed over the coil in evaporator section 11 where it is chilled by giving up its heat to vaporize the refrigerant passing through the evaporator coil. This chilled water is then forwarded by chilled water pump 32 through leaving chilled water line 33 to cool a desired region, and is returned through entering chilled water line 31 for recooling.

The refrigerant vapor is injected into heat exchange tubes 17 of absorber section 10 where the refrigerant vapor is absorbed in the strong absorbent solution, thus rendering it weak solution when it reaches upper header 15. Weak solution in upper header 15 is segregated in a weak solution sump 28 formed by a baffle 29. The weak solution is forwarded to generator section 13 from absorber section 10 through weak solution line 30.

In order to pump weak solution from the low pressure absorber side of the system to the high pressure generator side of the system, a trap 35 is provided. Trap 35 comprises an upper chamber 36, a lower chamber 37 and an intermediate chamber 38. An upper check valve 39 is provided through weak solution line 30 and upper chamber 36. A solution line 40 is provided between upper chamber 36 and lower chamber 37. A lower check valve 41 is provided between lower chamber 37 and intermediate chamber 38. A line 42 connects intermediate chamber 38 to rectifier section 43, and another line 44 connects intermediate chamber 38 to heat exchanger 14. A third line 45 connects the upper portion of intermediate chamber 38 with an outlet tank 46 which is vented through line 47 to the vapor side of rectifier 43.

An equalizer line 48 connects upper chamber 36 to the high pressure vapor side of rectifier section 43 through high pressure valve 49 and high pressure vapor line 50. Equalizer line 48 is also connected through low pressure valve 51, blow-down check valve 52, and low pressure vapor line 53 to the low pressure vapor space in upper header 15 of absorber section 10. A line 54 extends from blow-down check valve 52 to refrigerant vapor line 26 at some convenient point. A float 55 may be provided in upper chamber 36 to minimize the surface area of solution exposed therein.

In order to forward weak solution from line 30 to the high pressure side of the system, high pressure valve 49 is closed and low pressure valve 51 is opened, thereby venting upper chamber 36 to upper header 15. Weak solution flows by gravity through line 30 into upper chamber 36 through check valve 39 and into lower chamber 37 through line 40. This solution cannot flow through check valve 41 because the valve is maintained closed by the pressure exerted on intermediate chamber 38 by high pressure vapor at the top of outlet tank 46, which is vented to the high pressure side of rectifier 43. After upper chamber 36 has been filled with absorbent solution, or preferably after a predetermined time interval for filling chamber 36 has passed, low pressure valve 51 is closed and high pressure valve 49 is opened. Opening of high pressure valve 49 vents upper chamber 36 to the high pressure side of the system through line 50 which is connected to the high pressure vapor side of rectifier 43. Consequently, solution in upper chamber 36 may then drain through line 40, lower chamber 37, and check valve 41, into intermediate chamber 38. This solution then drains by gravity from intermediate chamber 38 through line 42 to rectifier 43 and through line 44 to heat exchanger 14. The rectifier and heat exchanger constitute a substantially fixed restriction to the drainage of solution from chamber 38 and the excess solution drains through line 45 into outlet tank 46 which may actually comprise any suitable region or other suitable means for storage of the solution which does not immediately pass through either the heat exchanger or the rectifier.

After a period of time, high pressure valve 49 is closed and low pressure valve 51 is again opened. Upon opening of low pressure valve 51, the high pressure vapor remaining in the top of upper chamber 36 from the previous portion of the cycle, pushes upwardly on the underside of blow-down check valve 52, closing communication between equalizer line 48 and low pressure line 53, while at the same time exhausting the high pressure vapor into refrigerant vapor line 26. This high pressure vapor is absorbed in the absorber section along with refrigerant vapor from the evaporator formed in the evaporator coil. After the high pressure vapor is exhausted from upper chamber 36, blow-down check valve 52 closes to its normal position and vents upper chamber 36 to upper header 15 of absorber section 10 to begin the cycle again.

The side of heat exchanger 14 which carries weak solution from line 44 is connected by line 59 to analyzer section 60. Analyzer 60 comprises a vertically extending column 61 for containing a substantial quantity of weak absorbent solution therein. An inlet 62 for passing absorbent solution to generator 16 is provided adjacent the lower end of the column of absorbent solution in analyzer 60. A gas burner 64 is provided to heat absorbent solution passed to generator 13, in order to concentrate the absorbent solution by vaporizing refrigerant therefrom. The mixture of vapor and concentrated absorbent formed in generator 13 is passed through outlet 63 to a separation chamber 65 disposed within the column of absorbent cotton in analyzer 60.

Separation chamber 65 preferably comprises a generally closed chamber having a top provided with a number of perforations or apertures 66 and an overflow and equalizer hole 68 in the side thereof. A strong solution discharge line 67 is provided to withdraw strong solution from separation chamber 65 and pass it to the strong solution side of heat exchanger 14 from which it passes through strong solution line 18 to absorber 10. The hot strong solution from the generator is thus passed in heat exchange relation with the relatively cooler weak solution passing to the generator through the analyzer as well as the weak solution side of heat exchanger 14 in order to economize the heating required in the generator.

The perforations or apertures 66 in the top of separation chamber 65 are made of a size sufficient to maintain a small pressure difference between the solution within chamber 65 and that of the solution stored in analyzer 60. Consequently, a small vapor space exists above the level of solution in separation chamber 65 which results from the separation of vapor and strong solution therein. The apertures in the upper portion of separation chamber 65 are arranged so as to distribute vapor evenly throughout the cross section of the analyzer. This hot vapor, which contains a substantial fraction of absorbent vapor as well as refrigerant vapor, is passed upwardly through the column of solution in the analyzer section. A plurality of horizontal baffles 71 may be provided to form a serpentine path for the passage of vapor bubbles, if desired. A mass and heat transfer relation takes place therebetween such that refrigerant is vaporized from the solution in the analyzer by contact with the relatively hot vapor, while at the same time the vaporized refrigerant is replaced by absorbent vapor which condenses into the absorbent solution. Consequently, the vapor reaching the upper portion of analyzer 60 is richer in refrigerant and poorer in absorbent than that which was injected into the analyzer from separation chamber 65.

The vapor, having an enriched refrigerant fraction, is forwarded from analyzer 60 through vapor line 75 to the vapor side of rectifier 43. The vapor is cooled in rectifier 43 by heat exchange with the relatively cool weak solution passing from line 42 through the weak solution side of the rectifier. Consequently, the vapor is further purified in the rectifier by condensing additional absorbent therefrom. Relatively pure refrigerant vapor emerging from rectifier 43 is forwarded through line 76 to condenser 12 where it is liquefied and passed to evaporator 11 as previously described. The absorbent, which is condensed in the vapor side of rectifier 43, is passed through rectifier condensate line 69 upwardly through the column of absorbent solution in analyzer 60. An aperture 70 is provided in line 69 above the level of solution in separation chamber 65 and below the top of the chamber to admit a controlled quantity of vapor into rectifier condensate line 69. Aperture 70 allows the admission of a small quantity of vapor into rectifier condensate line 69 so as to reduce the density of the solution therein, thereby causing the rectifier condensate to drain from the rectifier, through rectifier condensate line 69, into analyzer section 60 at a slightly higher elevation due to the vapor lift action in line 69.

Weak solution passed to the solution side of rectifier 43 is drained from the rectifier through line 77 into analyzer 60. Both line 77 and line 59 are connected to analyzer 60 below the level of solution therein and line 45 is connected to the outlet tank below the level of solution therein so as to provide a continuous liquid column from the solution in outlet tank 46 through rectifier 43 and through heat exchanger 14 to the solution stored in the analyzer. It will be observed that outlet tank 46 is disposed at least partially above the level of solution in analyzer 60 so that there exists a solution head between the solution level in the outlet tank and the solution level in the analyzer to pass absorbent solution from the outlet tank into the analyzer. Thus, solution is enabled to drain from outlet tank 46 into analyzer 60 and generator 13 during periods of time when trap 35 is admitting solution into chamber 36 as well as whenever the solution requirements of the generator section increase.

In operation, when the condensing temperature rises, as upon an increase in outdoor ambient temperature for an air-cooled condenser, the pressure in the condenser will rise. The rise in condenser pressure will result in increased flow of strong solution from the generator to the absorber and consequently an increased solution flow to the generator is required to balance the solution requirements of the system.

When the solution requirements of the generator increase, the additional solution is immediately supplied from the quantity of weak solution stored in analyzer 60. When this occurs, the level of solution in the analyzer drops, which provides a greater head between the level of solution in outlet tank 46 and the level of solution in analyzer 60. Heat exchanger 14 and rectifier 43 present a substantially fixed restriction to the flow of solution from outlet tank 46 into the analyzer. The increased head caused by the dropping in level in the analyzer causes an increased quantity of solution to flow through the rectifier and heat exchanger to the analyzer and the generator. Preferably, the cross sectional area of the solution in the analyzer is substantially less than that of the solution in the outlet tank so that a change in analyzer solution level has little effect on the solution level in outlet tank 46.

Consequently, the machine described automatically and quickly provides increased solution flows to the generator when required, while eliminating the necessity for a separate storage vessel to stabilize the operation of the generator. The outlet tank serves to smooth out the operation of the system and as a storage vessel for absorbent solution. The level of solution in the analyzer automatically and quickly adjusts to provide the desired solution head on the generator. Furthermore, the direct contact between vapor formed in the generator and the weak solution stored in the analyzer provides an extremely effective analyzing action to assist in enriching the refrigerant content of the vapor.

While there has been described a preferred embodiment of this invention, it will be appreciated that the invention may be otherwise embodied within the scope of the following claims.

I claim:

1. An absorption refrigeration machine containing an absorbent solution, and arranged to provide refrigeration, said machine comprising:

an absorber section for absorbing refrigerant vapor in said absorbent solution;

a generator section for concentrating absorbent solution and forming vapor;

an analyzer section comprising a vessel for containing a quantity of absorbent solution and for increasing the refrigerant concentration of vapor passed thereto;

means to pass vapor from said generator section, through the quantity of absorbent solution in said analyzer section;

a heat exchanger section;

passage means to pass strong solution from said generator section through said heat exchanger section, in heat exchange relation with weak solution, to said absorber section, said passage means being continuously open during operation of said machine for continuous transfer of strong solution from said generator to said absorber;

passage means to pass weak solution stored in said analyzer section to said generator section; and an outlet tank connected to receive only weak absorbent solution from said absorber section and to discharge said absorbent solution through said heat exchanger section to said analyzer section, said outlet tank being connected to said analyzer section through said heat exchanger section by means defining a continuous liquid column extending between the solution in said outlet tank and the solution in said analyzer section, so that the rate of flow of absorbent solution from said analyzer section to said generator section is automatically adjusted by variation in the level of solution in said analyzer section with respect to the level of solution in said outlet tank, thereby automatically maintaining sufficient head on said heat exchanger section to provide the desired flow rate of absorbent solution therethrough.

2. An absorption refrigeration machine containing an absorbent solution, and arranged to provide refrigeration, said machine comprising:

an absorber section for absorbing refrigerant vapor in said absorbent solution;

a generator section for concentrating absorbent solution and forming vapor;

an analyzer section comprising a vertically extending vessel for containing a quantity of absorbent solution in a vertically extending column above said generation section, and for increasing the refrigerant concentration of vapor passed thereto;

means to pass vapor formed in said generator section upwardly through said vertically extending column of absorbent solution in said analyzer section;

a heat exchanger section;

passage means to pass strong solution from said generator section through said heat exchanger section, in heat exchange relation with weak solution, to said absorber section, said passage means being continuously open during operation of said machine for continuous transfer of strong solution from said generator to said absorber;

passage means to pass weak solution from said analyzer section to said generator section;

an outlet tank connected to receive only weak absorbent solution from said absorber section and having passage means associated therewith to discharge said weak absorbent solution through said heat exchanger to said analyzer section; and said outlet tank being at least partly disposed above the level of said analyzer section and having a liquid level therein above the liquid level in said analyzer section, and said passage means associated with said outlet tank extending from a point below the level of absorbent solution therein to a point at said analyzer section below the level of solution therein, so as to maintain a sufficient solution head between said outlet tank and said analyzer section to provide a desired solution flow to said generator section.

3. An absorption refrigeration machine containing an absorbent solution and a refrigerant, said machine comprising:

an absorber section for the absorption of refrigerant vapor;

a generator section for concentrating absorbent solution and forming vapor;

an analyzer section for containing a quantity of absorbent solution and for increasing the refrigerant concentration of vapor passed thereto;

a rectifier section for stripping absorbent from vapor passed thereto;

a heat exchanger;

passage means to forward absorbent solution from said analyzer section to said generator section;

passage means to forward vapor formed in said generator section, through the liquid absorbent solution contained in said analyzer section, to said rectifier section;

an outlet tank, said outlet tank being disposed at least partially above the level of absorbent solution in said analyzer section;

passage means to pass absorbent solution from said absorber section to said outlet tank;

passage means to pass aborbent solution from said outlet tank through said heat exchanger and said rectifier section to said analyzer section, said passage means being connected to said outlet tank below the level of solution therein, and extending through said heat exchanger and said rectifier section to a location in said analyzer section below the level of solution therein, so as to provide a continuous liquid column between said outlet tank and said analyzer section; and said analyzer section being disposed at least partially below the level of solution in said outlet tank so that the level of solution in said analyzer section will automatically vary to provide sufficient head on said heat exchanger section and said rectifier section to pass the desired quantity of solution to said generator section under different conditions of operation of said machine.

4. An absorption refrigeration machine containing an absorbent solution and a refrigerant, said machine comprising:

an absorber section for the absorption of refrigerant vapor;

a generator section for concentrating absorbent solution and forming vapor;

an analyzer section for containing a quantity of absorbent solution and for increasing the refrigerant concentration of vapor passed thereto;

a rectifier section for stripping absorbent from vapor passed thereto;

a heat exchanger;

passage means to forward absorbent solution from said analyzer section to said generator section;

passage means to forward vapor formed in said generator section, through the quantity of liquid absorbent solution contained in said analyzer section, to said rectifier section; and an outlet tank connected to receive absorbent solution from said absorber section and to discharge said absorbent solution through said rectifier section and said heat exchanger into said analyzer section;

said heat exchanger, rectifier section, and analyzer section being connected and disposed with respect to each other so as to provide a continuous liquid column between said outlet tank and said generator section, so that the level of absorbent solution in said analyzer section varies with respect to the level in said outlet tank to provide a liquid head on said rectifier and heat exchanger sections, sufficient to maintain a desired rate of flow of absorbent solution to said generator section during various conditions of operation of said machine.

5. An absorption refrigeration machine containing an absorbent solution and a refrigerant, said machine comprising:

an absorber selection for the absorption of refrigerant vapor;

a generator section for concentrating absorbent solution and forming vapor;

an analyzer section for storing absorbent solution increasing the refrigerant concentration of vapor passed thereto;

a heat exchanger section;

an outlet tank connected to receive absorbent solution from said absorber section, said outlet tank being disposed a least partially above the level of absorbent solution in said analyzer section and having a cross-sectional area of stored absorbent solution therein substantially greater than the cross-sectional area of stored absorbent solution in said analyzer section;

passage means to forward weak absorbent solution from said outlet tank through said heat exchanger section to said analyzer section, said passage means being connected to said outlet tank below the level of absorbent solution stored therein, and being connected to said analyzer section below the level of absorbent solution stored therein, to provide a continuous liquid column therebetween;

passage means to forward weak absorbent solution from said outlet tank through said rectifier section to said analyzer section, said passage means being connected to said outlet tank below the level of absorbent solution stored therein, and being connected to said analyzer section below the level of absorbent solution stored therein, to provide a continuous liquid column therebetween;

passage means to forward absorbent solution stored in said analyzer section to said generator section;

passage means to forward vapor formed in said generator section through the liquid absorbent solution stored in said analyzer section to said rectifier section; and said analyzer section being disposed at least partially below the level of solution in said outlet tank so that as the level of solution in said analyzer section changes, the resulting change in solution head between said outlet tank and said analyzer will automatically pass the desired quantity of solution to said generator section through said heat exchanger and said rectifier section.

6. The method of operating an absorption refrigeration machine of the type containing an absorbent solution and a refrigerant and having an absorber section, a generator section, an analyzer section, and an outlet tank, in order to automatically accommodate the desired solution flow rates to the generator section for various conditions of operation of said machine, which comprises the steps of:

passing weak solution from said absorber section to said outlet tank and storing said weak solution therein;

passing weak solution from said absorber section to said analyzer section through said heat exchanger section and said rectifier section;

storing weak solution in said analyzer section for passage to said generator section;

passing solution from said analyzer section to said generator section for concentration thereof; and automatically varying the level of solution in said analyzer section in response to changes in solution flow requirements of said machine, so as to vary the head imposed by said outlet tank, on said heat exchanger section and said rectifier section in accordance with the solution flow requirements of said system, by providing a continuous liquid column extending between the solution stored in said outlet tank and the solution stored in said analyzer section.

References Cited by the Examiner

UNITED STATES PATENTS 2,263,067  11/1941  Burggrabe _____ 62—142

FREDERICK L. MATTESON, Jr., *Primary Examiner.*

ROBERT A. O'LEARY, *Examiner.*

C. R. REMKE, *Assistant Examiner.*

UNITED STATES PATENT OFFICE
CERTIFICATE OF CORRECTION

Patent No. 3,273,351                              September 20, 1966

Richard H. Merrick

It is hereby certified that error appears in the above numbered patent requiring correction and that the said Letters Patent should read as corrected below.

Column 5, line 7, for "cotton" read -- solution --; column 8, line 65, for "selection" read -- section --; same column 8, line 75, for "a" read -- at --.

Signed and sealed this 22nd day of August 1967.

(SEAL)
Attest:

ERNEST W. SWIDER
Attesting Officer

EDWARD J. BRENNER
Commissioner of Patents